(12) United States Patent
O'Loughlin et al.

(10) Patent No.: US 7,215,412 B2
(45) Date of Patent: May 8, 2007

(54) FLAGPOLE REFLECTORS FOR LASER RANGE FINDERS

(75) Inventors: Robert F. O'Loughlin, Madison, WI (US); Michael D. Plitman, Minneapolis, MN (US); Daniel Steiner, Waunakee, WI (US); Wayne Timberman, Carmel, IN (US)

(73) Assignee: Golf Solutions 1, L.L.C., Madison, WI (US)

( * ) Notice: Subject to any disclaimer, the term of this patent is extended or adjusted under 35 U.S.C. 154(b) by 258 days.

(21) Appl. No.: 10/931,947

(22) Filed: Sep. 1, 2004

(65) Prior Publication Data

US 2006/0044544 A1 Mar. 2, 2006

(51) Int. Cl.
*G01C 3/08* (2006.01)
(52) U.S. Cl. ............... 356/4.01; 356/4.02; 356/4.03; 356/5.01
(58) Field of Classification Search ............... 356/4.01
See application file for complete search history.

(56) References Cited

U.S. PATENT DOCUMENTS

| | | | | |
|---|---|---|---|---|
| 2,362,131 A * | 11/1944 | Haggart, Jr. | ............... | 340/321 |
| D242,775 S | 12/1976 | Williams, Jr. | | |
| 4,136,394 A | 1/1979 | Jones et al. | | |
| 4,813,494 A * | 3/1989 | Beard et al. | ............... | 173/91 |
| 5,723,840 A * | 3/1998 | Bojic et al. | ............... | 218/60 |
| 5,760,909 A * | 6/1998 | Nichols | ............... | 356/4.08 |
| 5,841,392 A * | 11/1998 | Kishimoto | ............... | 342/125 |
| 6,062,985 A | 5/2000 | Rege | | |
| 6,185,055 B1 * | 2/2001 | Feist | ............... | 359/831 |
| 6,266,628 B1 * | 7/2001 | Huep et al. | ............... | 702/150 |
| 6,346,055 B1 | 2/2002 | Rege | | |
| D465,174 S | 11/2002 | Ursprung | | |
| 2004/0223139 A1 * | 11/2004 | Vogel | ............... | 356/141.1 |
| 2005/0272515 A1 | 12/2005 | Hurley et al. | | |

OTHER PUBLICATIONS

Internet World Wide Web Page, http://www.laserlinkgolf.com/main.htm, printed Nov. 23, 2004.
Internet World Wide Web Page, http://www.mosquitocreekoutdoors.com/cgi-bin/SoftCart.exe/golf_gps.htm?E+scstore, printed Aug. 4, 2004.

* cited by examiner

*Primary Examiner*—Thomas H. Tarcza
*Assistant Examiner*—Luke D. Ratcliffe
(74) *Attorney, Agent, or Firm*—Foley & Lardner, LLP

(57) ABSTRACT

A system and method are provided for determining a distance to a target. The method includes sending light, at a first time, to a light reflector mounted in a reflector device, receiving light reflected from the light reflector at a second time, and determining the distance to the reflector device using the difference between the first time and the second time. The reflector device has a first lateral surface, a second lateral surface parallel to the first lateral surface, and a rod surface extending from the first lateral surface to the second lateral surface. The reflector device includes sockets arranged in the rod surface with a light reflector mounted in each socket. The sockets may be arranged in a plurality of rows with possibly a plurality of sockets in each row. The reflector device may be mounted as an insert to or at the top of a target to determine the distance to the target.

24 Claims, 10 Drawing Sheets

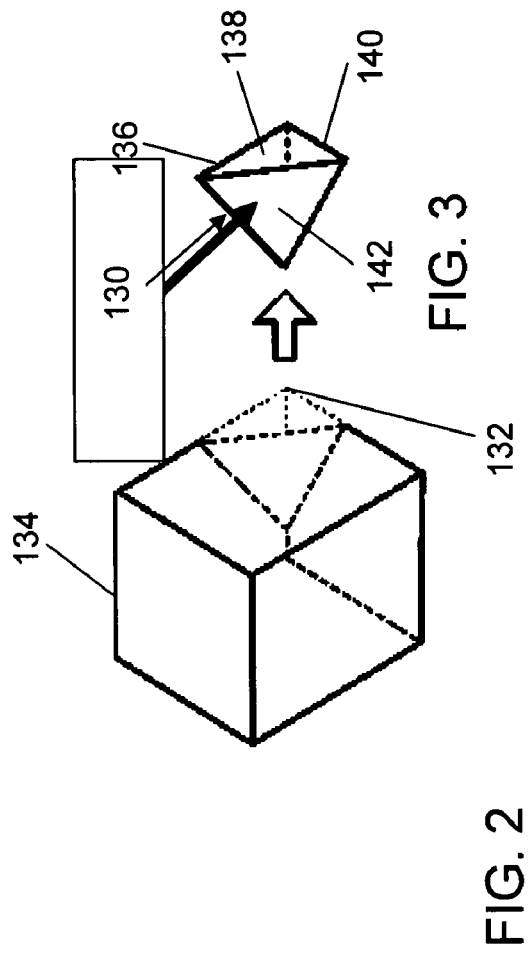
FIG. 3
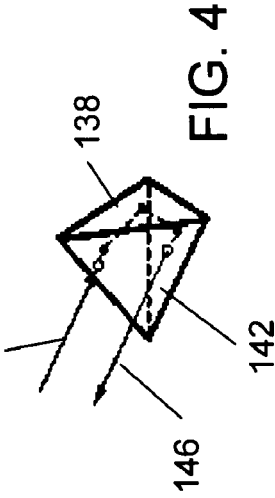
FIG. 4
FIG. 2
Transmit laser light pulses toward reflector device at a first time 110 → Receive laser light from a light reflector at a laser light receptor at a second time 112 → Determine distance from the laser range finder to the light reflector using the time difference 114

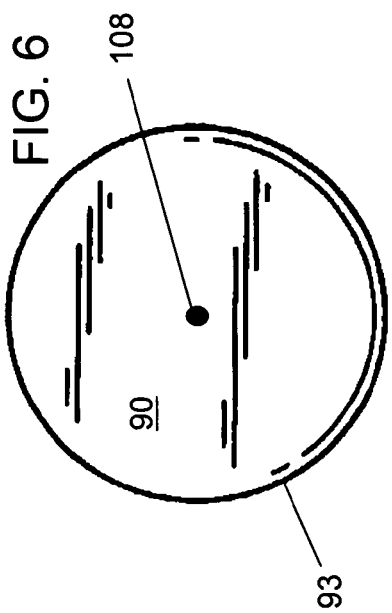
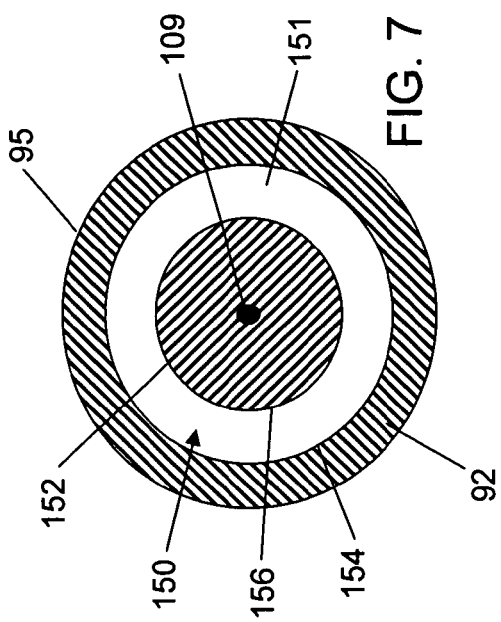
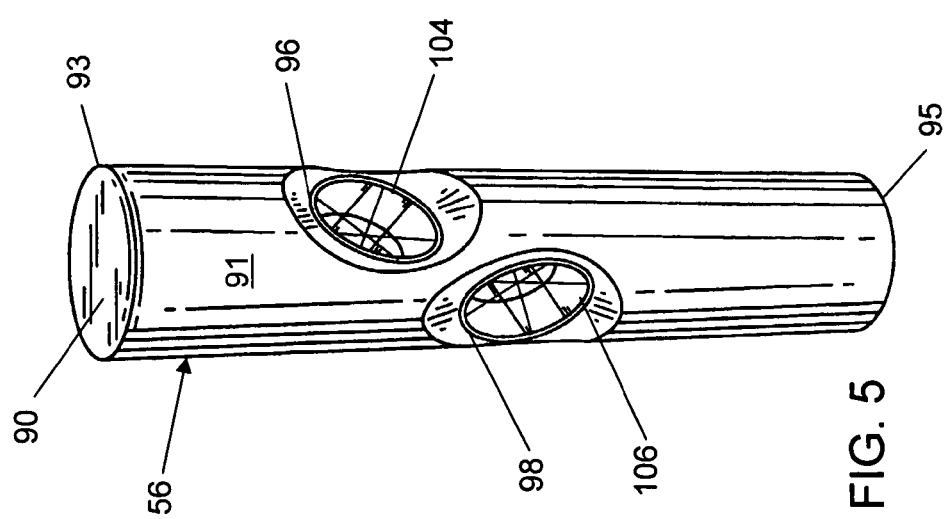

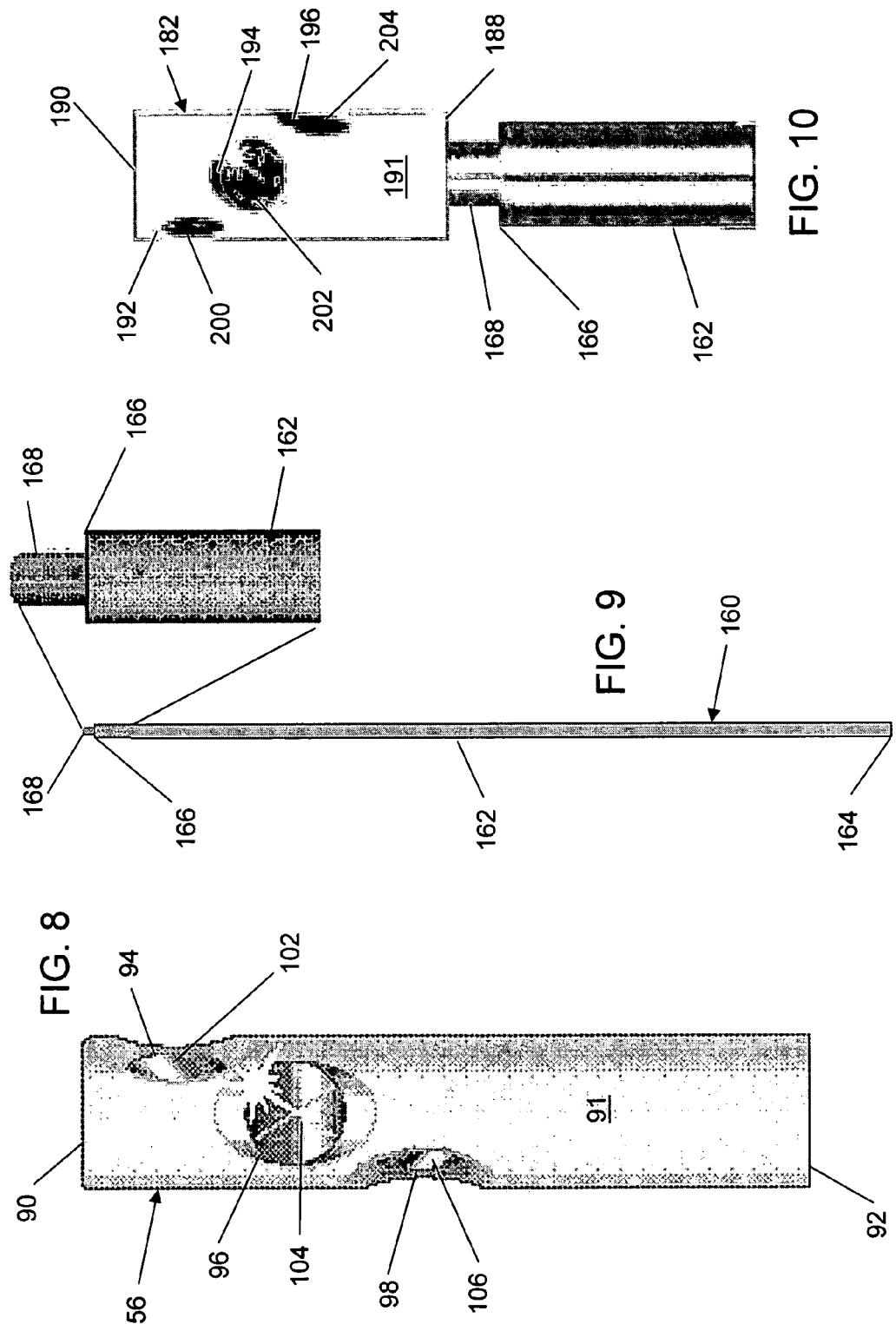

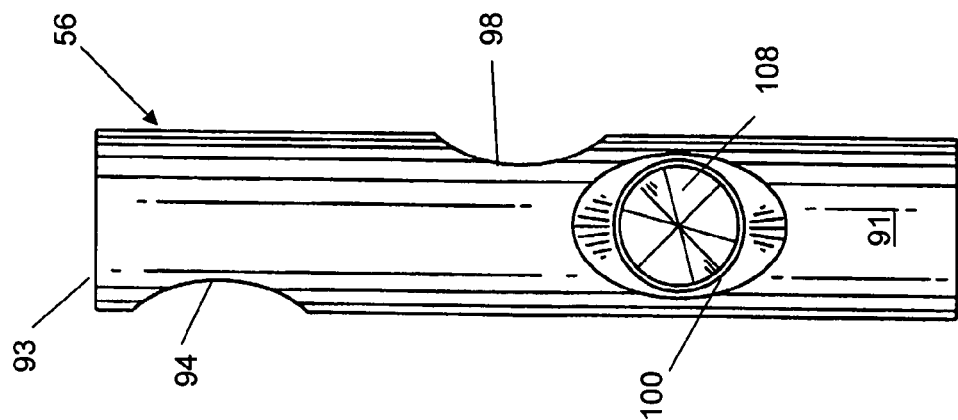
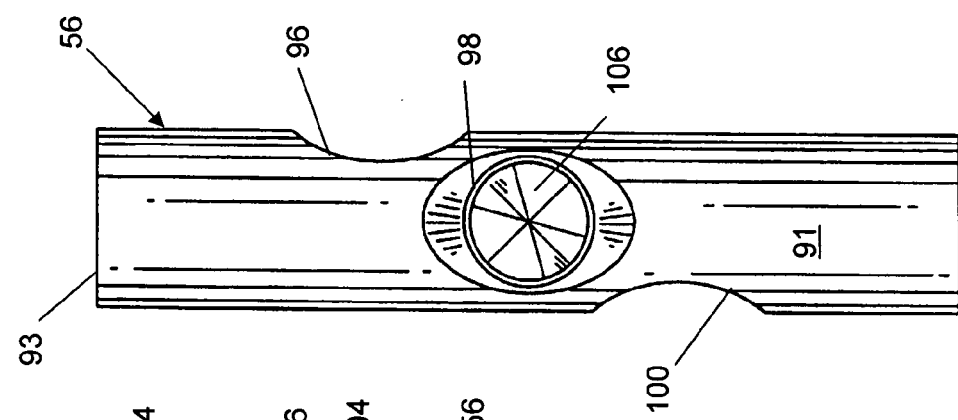
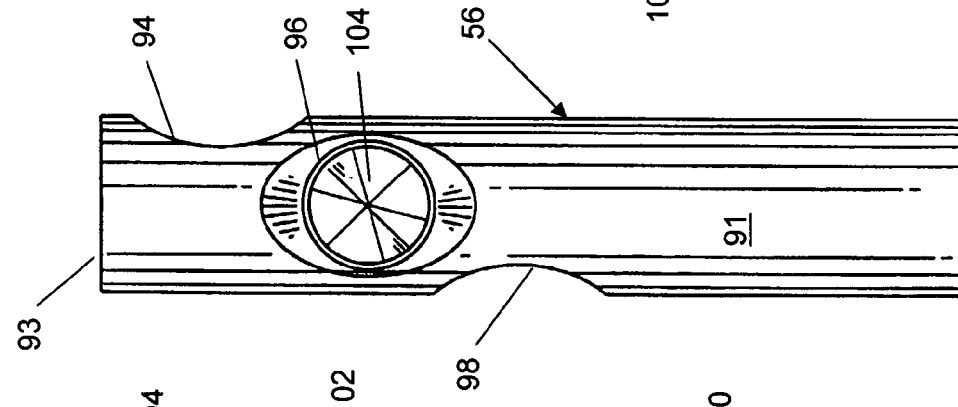
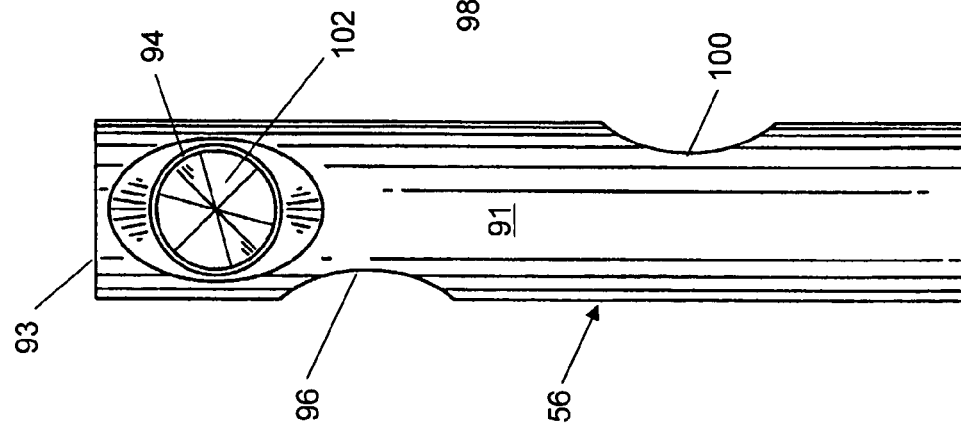

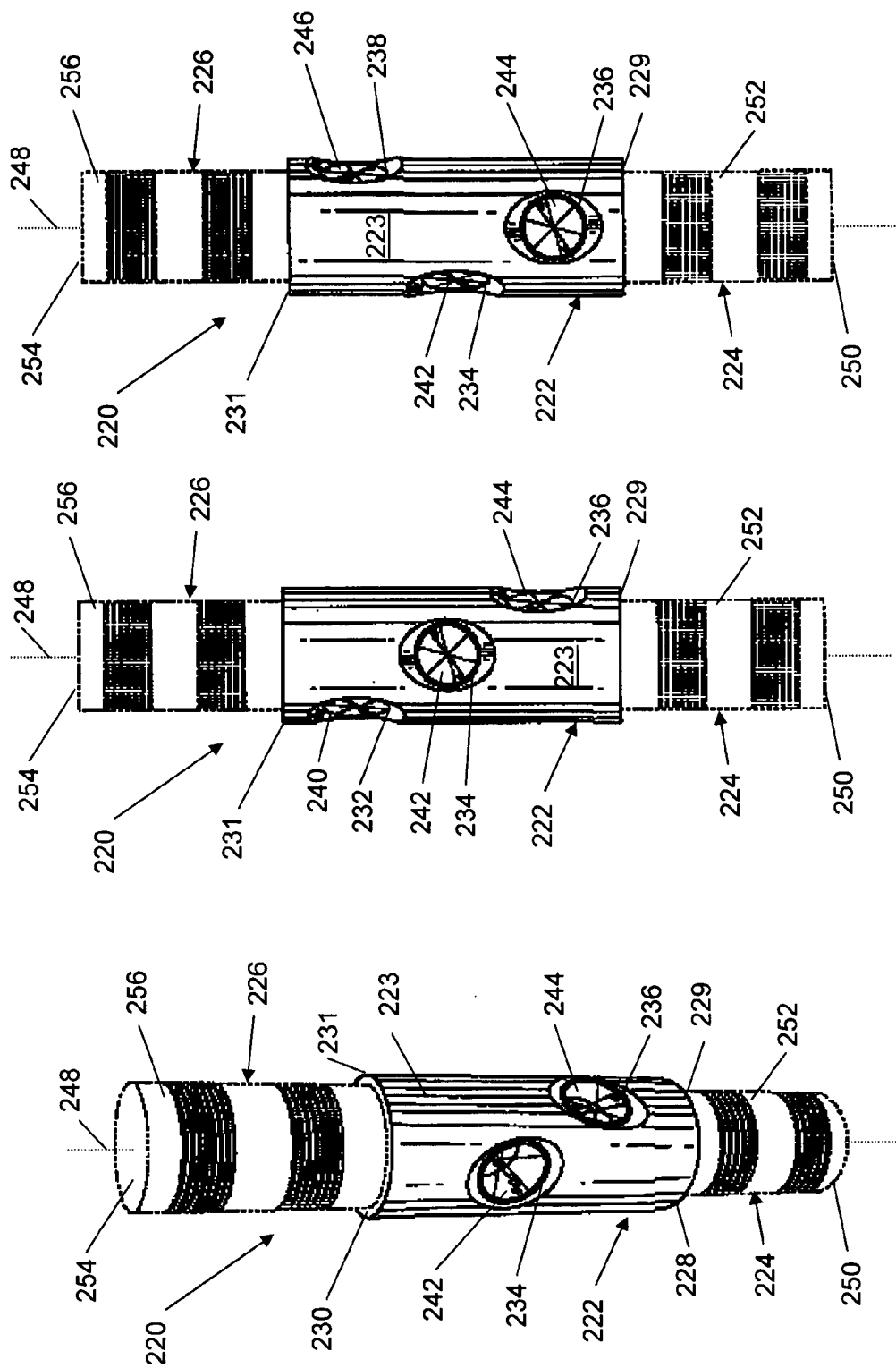

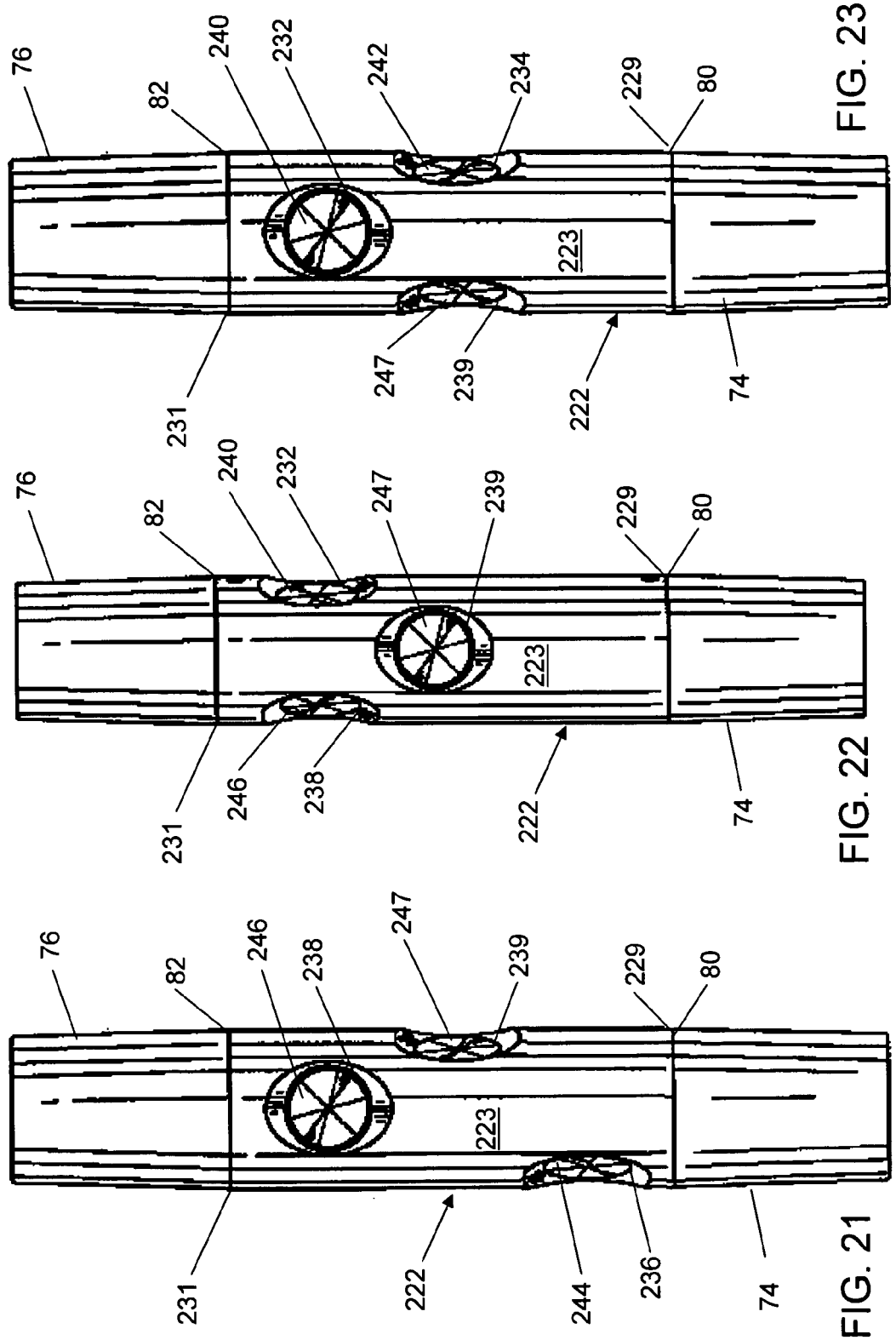

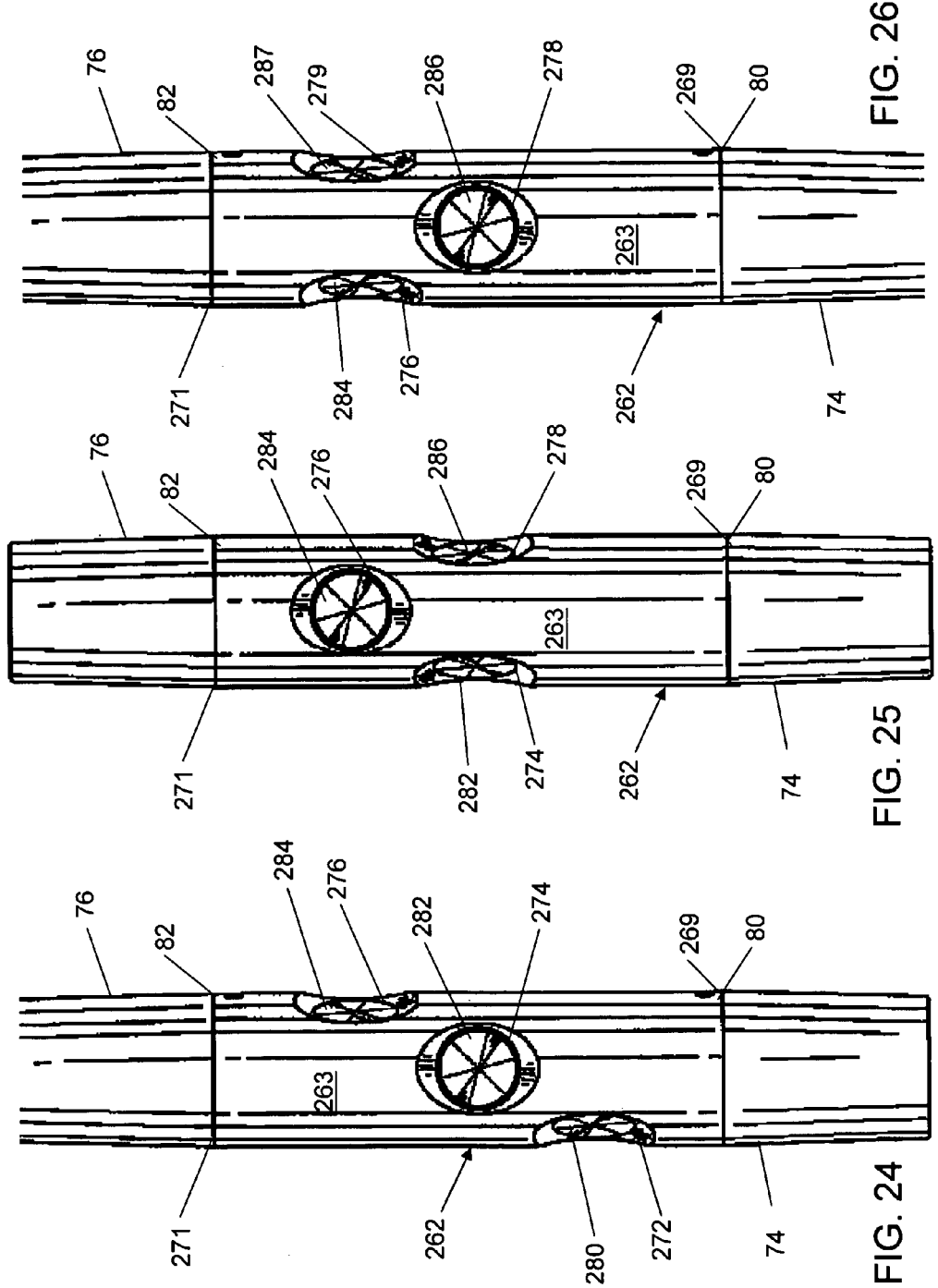

FLAGPOLE REFLECTORS FOR LASER RANGE FINDERS

FIELD OF THE INVENTION

The present invention is related to systems for determining a distance to an object. More specifically, the present invention relates to a reflector placed at a desired location, and the use of laser light to calculate a distance from a laser light source to the reflector location.

BACKGROUND OF THE INVENTION

Laser light can be used to measure the distance from the laser light source to a target object. Powerful lasers can measure distances of hundreds of millions of miles. Much less powerful lasers, however, are useful in measuring much shorter distances. Short range lasers can measure distances up to 300 yards and are much smaller in size, relatively inexpensive, and less hazardous. To measure distance, a laser transmits several pulses of light toward an intended target. The light is reflected from the target and is received by a receptor. A calculation is made to determine the distance to the target based on the elapsed travel time between the transmission of the pulse of light and the reception of the reflected pulse of light. When the target does not reflect sufficient laser light back to the receptor, errors in the distance measurement may result or a complete failure to measure any distance to the target may result. Thus, there is a need for an improved method and a system for accurately and for reliably measuring the distance to a known target. Further, there is a need for an improved method and system for measuring the distance to a known target that is simple to use.

SUMMARY OF THE INVENTION

An exemplary embodiment of the invention relates to a method for determining a distance to a target. The method includes, but is not limited to, sending light at a first time from a device to a reflector device, receiving light reflected from a light reflector at the device at a second time, and determining the distance from the device to the reflector device using the first time and the second time. The reflector device mounts to a pole. The reflector device includes, but is not limited to, a first lateral surface having a first exterior peripheral edge, a second lateral surface having a second exterior peripheral edge, a rod surface extending from the first exterior peripheral edge to the second exterior peripheral edge, two to four sockets, and the light reflector mounted in one of the two to four sockets. The two to four sockets are formed in the rod surface and arranged in a plurality of rows. The light reflector receives a portion of the light and reflects the received portion of the light back to the device.

An exemplary embodiment of the invention relates to a device for reflecting laser light back to a laser range finder. The device includes, but is not limited to, a first lateral surface having a first exterior peripheral edge, a second lateral surface having a second exterior peripheral edge, a rod surface extending from the first exterior peripheral edge to the second exterior peripheral edge, two to four sockets, and a light reflector mounted in each of the two to four sockets. The two to four sockets are formed in the rod surface and arranged in a plurality of rows. A portion of light directed at the device from a laser is reflected back to the laser by at least one light reflector.

Another exemplary embodiment of the invention relates to a device for reflecting laser light back to a laser range finder. The device includes, but is not limited to, a pole and a reflector device. The reflector device mounts to the pole. The reflector device includes, but is not limited to, a first lateral surface having a first exterior peripheral edge, a second lateral surface having a second exterior peripheral edge, a rod surface extending from the first exterior peripheral edge to the second exterior peripheral edge, two to four sockets, and a light reflector mounted in each of the two to four sockets. The two to four sockets are formed in the rod surface and arranged in a plurality of rows. A portion of light directed at the device from a laser is reflected back to the laser by at least one light reflector.

Still another exemplary embodiment of the invention relates to a system for determining a distance to a target. The system includes, but is not limited to, a laser range finder, a pole, and a reflector device. The laser range finder is configured to send light at a first time to the reflector device, to receive a portion of the light reflected from the reflector device at a second time, and to determine the distance from the laser range finder to the reflector device using the first time and the second time. The reflector device mounts to the pole. The reflector device includes, but is not limited to, a first lateral surface having a first exterior peripheral edge, a second lateral surface having a second exterior peripheral edge, a rod surface extending from the first exterior peripheral edge to the second exterior peripheral edge, two to four sockets, and a light reflector mounted in each of the two to four sockets. The two to four sockets are formed in the rod surface and arranged in a plurality of rows. A portion of the light directed at the reflector device from the laser range finder is reflected back to the laser range finder by at least one light reflector.

An exemplary embodiment of the invention relates to a method for determining a distance to a target. The method includes, but is not limited to, sending light at a first time from a device to a reflector device, receiving light reflected from a light reflector at the device at a second time, and determining the distance from the device to the reflector device using the first time and the second time. The reflector device mounts to a pole. The reflector device includes, but is not limited to, a first lateral surface having a first exterior peripheral edge, a second lateral surface having a second exterior peripheral edge, a rod surface extending from the first exterior peripheral edge to the second exterior peripheral edge, a plurality of sockets, and the light reflector mounted in one of the plurality of sockets. The plurality of sockets are formed in the rod surface and arranged in a plurality of rows. Two or more sockets are arranged in at least one row of the plurality of rows. The light reflector receives a portion of the light and reflects the received portion of the light back to the device.

An exemplary embodiment of the invention relates to a device for reflecting laser light back to a laser range finder. The device includes, but is not limited to, a first lateral surface having a first exterior peripheral edge, a second lateral surface having a second exterior peripheral edge, a rod surface extending from the first exterior peripheral edge to the second exterior peripheral edge, a plurality of sockets, and a light reflector mounted in each of the plurality of sockets. The plurality of sockets are formed in the rod surface and arranged in a plurality of rows. Two or more sockets are arranged in at least one row of the plurality of rows. A portion of light directed at the device from a laser is reflected back to the laser by at least one light reflector.

Another exemplary embodiment of the invention relates to a device for reflecting laser light back to a laser range finder. The device includes, but is not limited to, a pole and a reflector device. The reflector device mounts to the pole. The reflector device includes, but is not limited to, a first lateral surface having a first exterior peripheral edge, a second lateral surface having a second exterior peripheral edge, a rod surface extending from the first exterior peripheral edge to the second exterior peripheral edge, a plurality of sockets, and a light reflector mounted in each of the plurality of sockets. The plurality of sockets are formed in the rod surface and arranged in a plurality of rows. Two or more sockets are arranged in at least one row of the plurality of rows. A portion of light directed at the device from a laser is reflected back to the laser by at least one light reflector.

Still another exemplary embodiment of the invention relates to a system for determining a distance to a target. The system includes, but is not limited to, a laser range finder, a pole, and a reflector device. The laser range finder is configured to send light at a first time to the reflector device, to receive a portion of the light reflected from the reflector device at a second time, and to determine the distance from the laser range finder to the reflector device using the first time and the second time. The reflector device mounts to the pole. The reflector device includes, but is not limited to, a first lateral surface having a first exterior peripheral edge, a second lateral surface having a second exterior peripheral edge, a rod surface extending from the first exterior peripheral edge to the second exterior peripheral edge, a plurality of sockets, and a light reflector mounted in each of the plurality of sockets. The plurality of sockets are formed in the rod surface and arranged in a plurality of rows. Two or more sockets are arranged in at least one row of the plurality of rows. A portion of the light directed at the reflector device from the laser range finder is reflected back to the laser range finder by at least one light reflector.

Other principal features and advantages of the invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals will denote like elements. The objects shown in the figures may not be drawn to the same scale.

FIG. 2 is a functional flow diagram of operations performed in the distance measuring system of FIG. 1 in accordance with an exemplary embodiment.

FIG. 3 is a diagram illustrating the structure of an example reflector of the distance measuring system of FIG. 1.

FIG. 4 is a diagram illustrating a laser light reception and reflection path for the example reflector of the distance measuring system of FIG. 3.

FIG. 5 is a perspective view of a first example reflector device of the distance measuring system of FIG. 1.

FIG. 6 is a top view of the first example reflector device of FIG. 5.

FIG. 7 is a bottom view of the first example reflector device of FIG. 5.

FIG. 8 is a side view of the first example reflector device of FIG. 5.

FIG. 9 is a side view of an example pole for mounting the first example reflector device of FIG. 5.

FIG. 10 is a side view of a second example reflector device mounted to the example pole of FIG. 9.

FIG. 11 is a first side view of the first example reflector device of FIG. 5.

FIG. 12 is a second side view of the first example reflector device of FIG. 11 with the first example device rotated approximately 90 degrees in a counter clockwise direction as viewed from the top of the first example reflector device of FIG. 11.

FIG. 13 is a third side view of the first example reflector device of FIG. 11 with the first example device rotated approximately 180 degrees in a counter clockwise direction as viewed from the top of the first example reflector device of FIG. 11.

FIG. 14 is a fourth side view of the first example reflector device of FIG. 11 with the first example device rotated approximately 270 degrees in a counter clockwise direction as viewed from the top of the first example reflector device of FIG. 11.

FIG. 18 is a perspective view of a third example reflector device.

FIG. 19 is a side view of the third example reflector device of FIG. 18.

FIG. 20 is a side view of the third example reflector device of FIG. 19 with the third example reflector device rotated approximately 72 degrees in a clockwise direction as viewed from the top of the third example reflector device of FIG. 19.

FIG. 21 is a side view of the third example reflector device of FIG. 19 with the third example reflector device rotated approximately 144 degrees in a clockwise direction as viewed from the top of the third example reflector device of FIG. 19 and mounted as an insert.

FIG. 22 is a side view of the third example reflector device of FIG. 19 with the third example reflector device rotated approximately 216 degrees in a clockwise direction as viewed from the top of the third example reflector device of FIG. 19 and mounted as an insert.

FIG. 23 is a side view of the third example reflector device of FIG. 19 with the third example reflector device rotated approximately 288 degrees in a clockwise direction as viewed from the top of the third example reflector device of FIG. 19 and mounted as an insert.

FIG. 24 is a side view of a fourth example reflector device mounted as an insert.

FIG. 25 is a side view of the fourth example reflector device of FIG. 24 with the fourth example reflector device rotated approximately 72 degrees in a clockwise direction as viewed from the top of the fourth example reflector device of FIG. 24 and mounted as an insert.

FIG. 26 is a side view of the fourth example reflector device of FIG. 24 with the fourth example reflector device rotated approximately 144 degrees in a clockwise direction as viewed from the top of the fourth example reflector device of FIG. 24 and mounted as an insert.

DETAILED DESCRIPTION OF EXEMPLARY EMBODIMENTS

Figure 1:
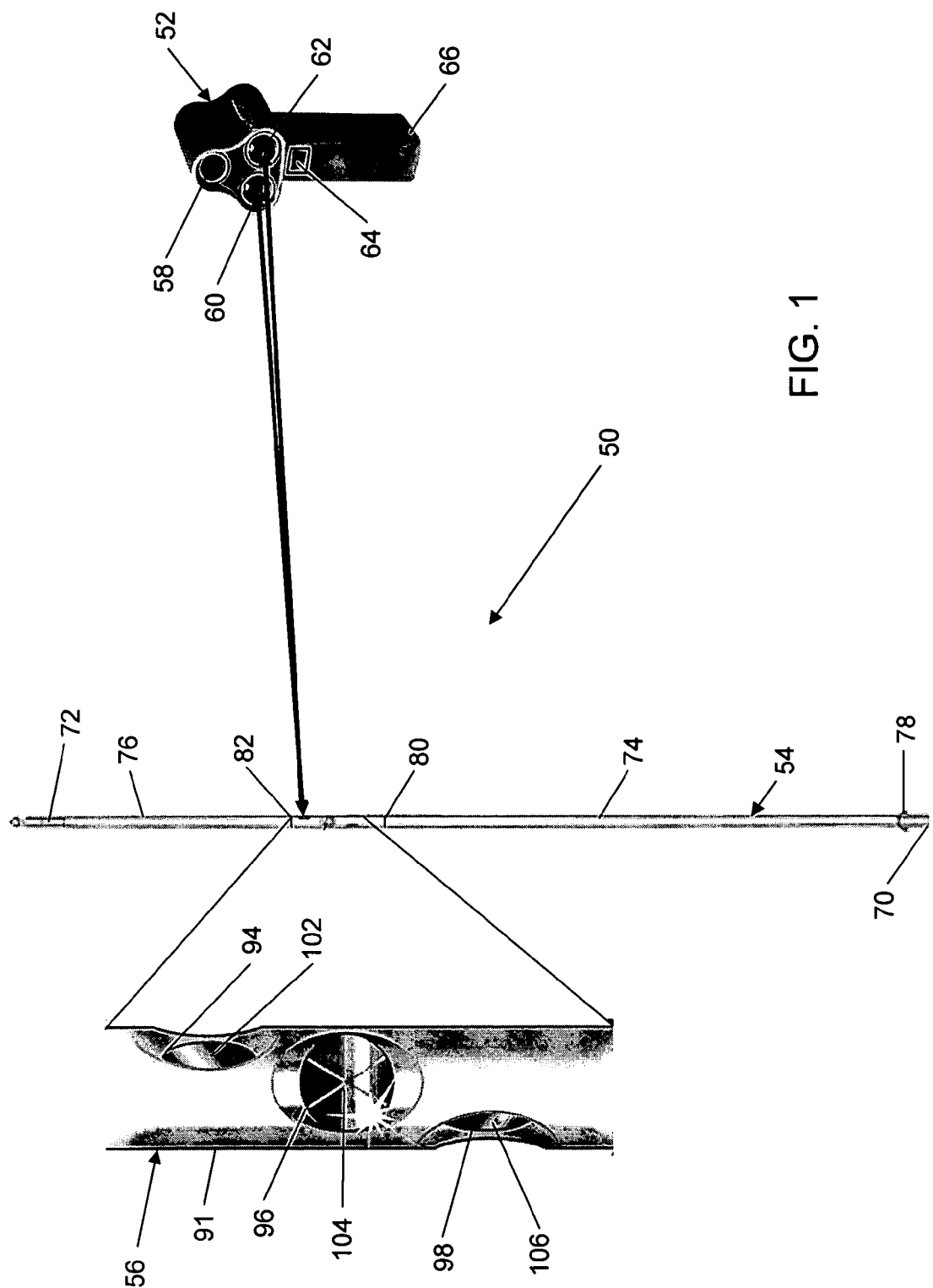
FIG. 1 is an overview diagram of a distance measuring system in accordance with an exemplary embodiment including a first example reflector device.

With reference to FIG. 1, a distance measuring system 50 that includes, but is not limited to, a handheld laser range finder 52, a pole 54, and a reflector device 56 is shown in an exemplary embodiment. The laser range finder 52 includes, but is not limited to, an aiming light source 58, a laser light source 60, a laser light receptor 62, a measurement button 64, and a handle 66. The aiming light source 58 transmits a light, for example a red light, toward a current aiming point so that the user can visually identify where the laser range finder 52 is currently aimed. The laser light source 60 transmits laser light toward the current aiming point when the measurement button 64 is depressed by the user. The laser light may be transmitted in a series of laser light pulses. The laser light source 60 may be a Class 1 laser as known to those skilled in the art. A Class 1 laser is considered safe based upon current medical knowledge. The laser light receptor 62 receives laser light reflected back toward the laser range finder 52 from the current aiming point. The handle 66 provides the user with a grasping point for the laser range finder 52 and provides access to the measurement button 64 while keeping the hands of the user away from the laser light source 60 and the laser light receptor 62. The handle 66 may be held in the palm of the user's hand.

In the exemplary embodiment of FIG. 1, the reflector pole 54 includes, but is not limited to, a first end 70, a second end 72, a first pole 74, a second pole 76, and an upright nut 78. The first end 70 provides a surface to support the reflector pole 54 upright, for example, in a flagpole stand placed at the bottom of a golf hole. The upright nut 78 may be placed near the first end 70 to provide additional support for the reflector pole 54, for example, when the first end 70 of the reflector pole 54 is placed in the golf hole. The second end 72 is opposite the first end 70. The first pole 74 extends from the first end 70 to a first mounting end 80. The second pole 76 extends from a second mounting end 82 to the second end 72.

In the exemplary embodiment of FIG. 1, the reflector device 56 is mounted to the reflector pole 54 between the first mounting end 80 of the first pole 74 and the second mounting end 82 of the second pole 76. As used in this disclosure, the term "mount" includes join, unite, connect, associate, insert, hang, hold, affix, attach, fasten, bind, paste, secure, bolt, screw, rivet, solder, weld, and other like terms. The reflector device 56 may be mounted in the reflector pole 54 as shown in FIG. 1 or may be mounted to the second end 72 of the reflector pole 54 as described with reference to FIG. 10. The reflector device 56 generally should be mounted a sufficient distance above the first end 70 to allow a laser range finder 52 to aim at the reflector device 56 from the desired distance without obstruction from the ground. Additionally, the reflector device 56 should be mounted a sufficient distance above or below any other obstructions that may be attached to the reflector pole 54. For example, the reflector pole 54 may have a flag attached near the second end 72. If so, the reflector device 56 should be mounted such that the flag will not cover the reflector device 56.

The reflector device 56 may include, but is not limited to, a first socket 94, a second socket 96, a third socket 98, a fourth socket 100 (not shown in FIG. 1), a first light reflector 102, a second light reflector 104, a third light reflector 106, and a fourth light reflector 108 (not shown in FIG. 1). The first socket 94, the second socket 96, the third socket 98, and the fourth socket 100 have a size and shape sufficient to hold the first light reflector 102, the second light reflector 104, the third light reflector 106, and the fourth light reflector 108, respectively. The first light reflector 102 is mounted in the first socket 94. The second light reflector 104 is mounted in the second socket 96. The third light reflector 106 is mounted in the third socket 98. The fourth light reflector 108 is mounted in the fourth socket 100.

With reference to the functional flow diagram of FIG. 2, the operations of the distance measuring system 50 are described. Additional, fewer, or different operations may be performed depending on the embodiment. A user aims the laser range finder 52 at the reflector device 56 mounted in the reflector pole 54 using the aiming light source 58. The user depresses the measurement button 64 to determine the distance from the laser range finder 52 to the reflector device 56. In response and at operation 110, the laser light source 60 transmits pulses of laser light toward the reflector device 56 at a first time. At least one of the light reflectors 102, 104, 106, 108 of the reflector device 56 receives the transmitted laser light pulses. The light reflector receiving the transmitted laser light pulses reflects the laser light back toward the laser light receptor 62. The laser light receptor 62 receives the reflected laser light from the light reflector at operation 112 at a second time. At operation 114, the laser range finder 52 determines the distance from the laser range finder 52 to the reflector device 56 based on the time difference between the first time and the second time. The distance equals the time difference between the first time and the second time divided by two and further multiplied by the speed of light.

With reference to FIG. 3, a corner cube reflector 130 is shown. The corner cube reflector 130 is cut from a corner 132 of a cube of glass 134. The corner cube reflector 130 has three mutually orthogonal reflecting faces 136, 138, 140 and an entrance/exit face 142. With reference to FIG. 4, a ray of light 144 entering the entrance/exit face 142 undergoes three internal reflections, one reflection from each of the three mutually orthogonal reflecting faces 136, 138, 140. After the third reflection, a ray of light 146 exits the entrance/exit face 142 in the opposite direction of the original incoming ray of light 144.

The retro-reflective behavior of the corner cube reflector 130 is independent of the orientation angle between the corner cube reflector and the ray of light incident on the entrance/exit face 142. The retro-reflective behavior depends only on the accuracy of the squareness of the corner 132. As known to those skilled in the art, corner cube reflectors may also be known as a corner cube, a trihedral retro-reflector, a trihedral prism, a corner cube prism, and/or a corner cube retro-reflector. The light reflectors 102, 104, 106, 108 may be corner cube reflectors formed from glass or other similarly reflective material. Use of the corner cube reflector 130 for the light reflectors 102, 104, 106, 108 increases the amount of laser light that is reflected back toward the laser light receptor 62 by reducing the amount of laser light that would otherwise be scattered in directions other than back toward the laser range finder 52. As a result, the laser range finder provides a more accurate and reliable measurement of the distance.

With reference to FIG. 5, a perspective view of the reflector device 56 is shown. The reflector device 56 may further include, a first lateral surface 90, a rod surface 91, and a second lateral surface 92 (not shown in FIG. 5). The first lateral surface 90 has a first exterior peripheral edge 93. The first exterior peripheral edge 93 defines a shape having a first center 108 shown in FIG. 6. The shape may be any shape including, but not limited to, circular, square, triangular, rectangular, hexagonal, etc. The second lateral surface 92 has a second exterior peripheral edge 95. The second exterior peripheral edge 95 defines a shape having a second center 109 shown in FIG. 7. The shape may be any shape including, but not limited to, circular, square, triangular, rectangular, hexagonal, etc. The rod surface 91 extends from the first exterior peripheral edge 93 to the second exterior peripheral edge 95. The first socket 94, the second socket 96, the third socket 98, and the fourth socket 100 are formed in the rod surface 91 and arranged in a plurality of rows. In the exemplary embodiment, sockets in a row have a common distance from the first center 108 to a center of the socket 94, 96, 98, 100. Sockets in a row may also have a common vertical distance from the first exterior peripheral edge 93 and/or from the second exterior peripheral edge 95. As a result, the reflectors 102, 104, 106, 108 are mounted in the reflector device 56 in a vertical stack and arranged to point in a direction rotated 90 degrees from an adjacent reflector thereby providing 360 degrees of coverage relative to a center axis extending from the first center 108 to the second center 109. Thus, the laser light transmitted from the laser range finder 52 reflects from at least one reflector 102, 104, 106, 108 regardless of the pointing direction from the laser range finder 52 to the pole 54. Where a different number of light reflectors is used, the light reflectors may be separated by a different number of degrees to provide the 360 degrees of coverage.

FIG. 6 shows a top view of the reflector device 56. FIG. 7 shows a bottom view of the reflector device 56. In the exemplary embodiment of FIG. 7, the second lateral surface 92 includes, but is not limited to, a mounting socket 150. The mounting socket 150 includes, but is not limited to, an interior surface 151 and a third lateral surface 152. The interior surface 151 extends in a generally perpendicular direction from an interior peripheral edge 154 of the second lateral surface 92 to a peripheral edge 156 of the third lateral surface 152. The mounting socket 150 may vary in depth. In an exemplary embodiment, the depth of the mounting socket 150 is approximately 0.875 inches. The interior surface 151 of the socket 150 may be threaded. The number of threads of the interior surface 151 may vary. In an exemplary embodiment, the number of threads is 24. In an alternative embodiment, the number of threads is 16.

The third lateral surface 152 extends from the interior surface 151 toward the second center 109. The third lateral surface 152 may vary in size and shape. In an exemplary embodiment the third lateral surface 152 may be circular in shape and have a diameter of approximately 0.375 inches. In an alternative embodiment, the third lateral surface 152 may be conical to accommodate the second end 72 of the reflector pole 54 as shown in FIG. 1. The interior surface 151 may slope from the interior peripheral edge 154 of the second lateral surface 92 to the peripheral edge 156 at an angle less than 90 degrees as measured relative to the second lateral surface 92 pointed toward the second center 109.

The reflector device 56 may be formed of aluminum or any other material capable of holding the light reflectors 102, 104, 106, 108. The reflector device 56 may be painted various colors, for example, white, yellow, black, etc. The reflector device 56 may be coated in reflective material. The dimensions of the reflector device 56 may be adjusted based on the size of the light reflectors 102, 104, 106, 108. In an exemplary embodiment, the diameter of the first lateral surface 90 is approximately 0.625 inches, and the length of the rod surface 91 is approximately 3.375 inches. The entrance/exit face 142 of the light reflectors 102, 104, 106, 108, in an exemplary embodiment, may be 12 millimeters in diameter.

With reference to FIG. 8, a side view of the reflector device 56 is shown. FIG. 9 depicts a side view of a reflector pole 160 in an alternative embodiment to the reflector pole 54. The reflector pole 160 includes, but is not limited to, a first pole 162, a first end 164, a second end 166, and a stem 168. The first end 164 provides a surface to support the reflector pole 160 upright, for example, in a flagpole stand placed at the bottom of a golf hole. The second end 166 is opposite the first end 164. The first pole 162 extends from the first end 164 to the second end 166.

The stem 168 extends from the second end 166 in a generally perpendicular direction. The socket 150 of the reflector device 56 may be mounted to the stem 168 of the reflector pole 160. For example, FIG. 10 depicts a reflector device 182 mounted to the stem 168 of the reflector pole 160. In an alternative embodiment, the stem 168 may have a diameter that is greater than or equal to a diameter of the second end 166. The surface of the stem 168 may be threaded. If the interior surface 151 of the socket 150 is threaded, the surface of the stem 168 generally also is threaded, and the thread of the stem 168 cooperates with the thread of the interior surface 151 of the socket 150. The stem 168 at the first end 166 of the reflector pole 160 may screw into the socket 150 of the reflector device 56. If the interior surface 151 of the socket 150 is not threaded, the reflector device 56 may slide onto the stem 168 at the first end 166 of the reflector pole 160. In an alternative embodiment, the second lateral surface 92 may include a stem that extends from the second lateral surface 92. The second end 166 of the reflector pole 160 may include a socket that accommodates the stem. The reflector device 56 may slide into the socket at the first end 166 of the reflector pole 160. The stem and the socket may be threaded. If the interior surface of the socket is threaded, the reflector device may screw into the socket at the first end 166 of the reflector pole 160.

With reference to FIG. 10, the reflector device 182 may include, but is not limited to, a first exterior peripheral edge 188, a second exterior peripheral edge 190, a rod surface 191, a first socket 192, a second socket 194, a third socket 196, a fourth socket 198 (not shown in FIG. 10), a first light reflector 200, a second light reflector 202, a third light reflector 204, and a fourth light reflector 206 (not shown in FIG. 10). The first socket 192, the second socket 194, the third socket 196, and the fourth socket 198 have a size and shape sufficient to hold the first light reflector 200, the second light reflector 202, the third light reflector 204, and the fourth light reflector 206, respectively. The first light reflector 200 is mounted in the first socket 192. The second light reflector 202 is mounted in the second socket 194. The third light reflector 204 is mounted in the third socket 196. The fourth light reflector 206 is mounted in the fourth socket 198. The reflector device 182 shows an alternative arrangement of the light reflectors.

FIGS. 11–14 show side views of the reflector device 56 successively rotated in 90 degree increments to show the arrangement of the first socket 94, the second socket 96, the third socket 98, and the fourth socket 100 and the first light reflector 102, the second light reflector 104, the third light reflector 106, and the fourth light reflector 108 mounted in the corresponding socket 94, 96, 98, 100 in an exemplary embodiment. FIG. 12 shows the reflector device 56 of FIG. 11 rotated 90 degrees relative to a center axis extending from the first center 108 to the second center 109 in a counter clockwise direction as viewed from the first lateral surface 90. FIG. 13 shows the reflector device 56 of FIG. 12 rotated an additional 90 degrees in the same direction. FIG. 14 shows the reflector device 56 of FIG. 13 rotated an additional 90 degrees in the same direction.

Figure 15:
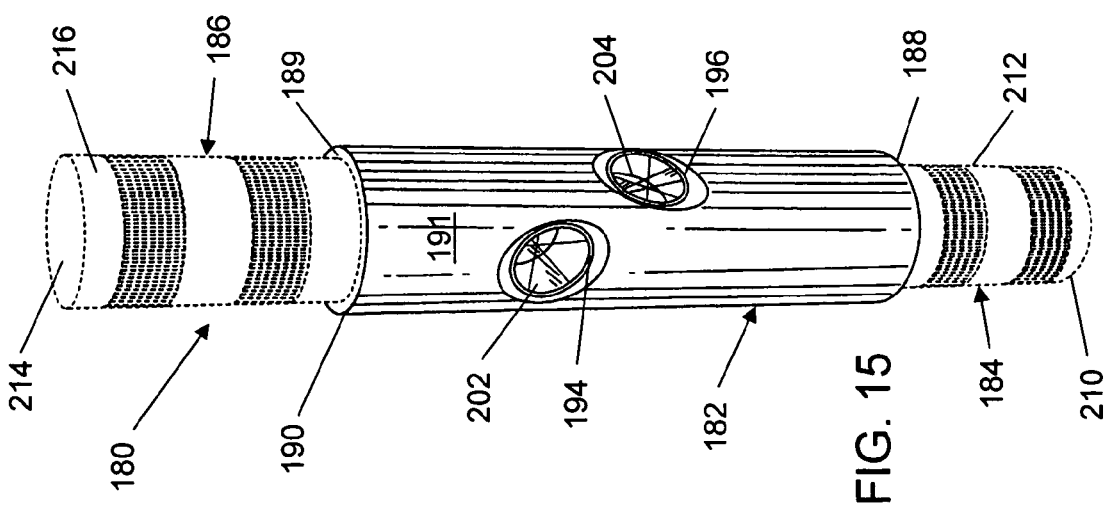
FIG. 15 is a perspective view of the second example reflector device of FIG. 10 for mounting as an insert in a pole as depicted in FIG. 1.
Figure 28:
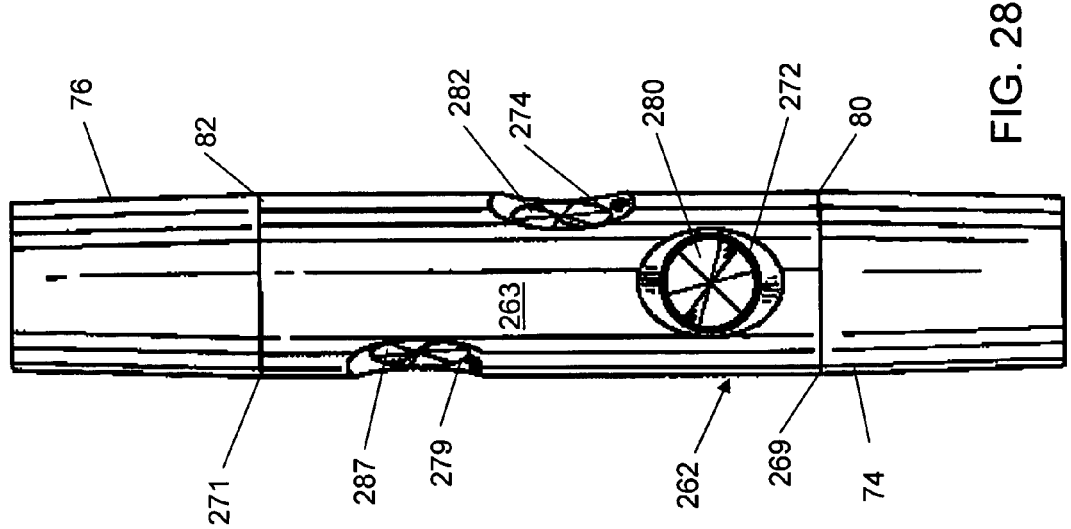
FIG. 28 is a side view of the fourth example reflector device of FIG. 24 with the fourth example reflector device rotated approximately 288 degrees in a clockwise direction as viewed from the top of the fourth example reflector device of FIG. 24 and mounted as an insert.
Figure 27:
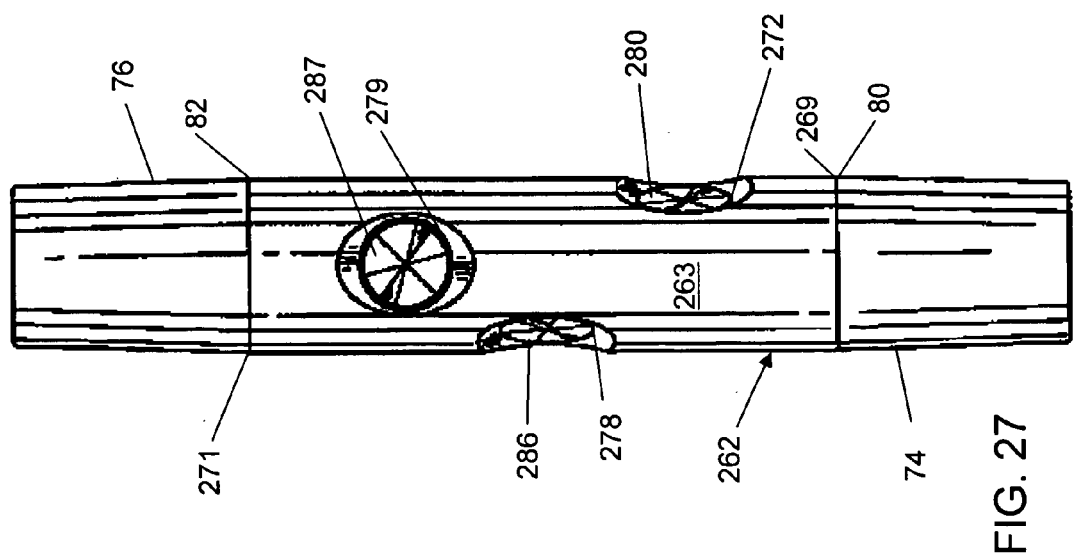
FIG. 27 is a side view of the fourth example reflector device of FIG. 24 with the fourth example reflector device rotated approximately 216 degrees in a clockwise direction as viewed from the top of the fourth example reflector device of FIG. 24 and mounted as an insert.

In an alternative embodiment, a reflector insert 180 may be used as an insert in a reflector pole 54 in the manner depicted in FIG. 1. With reference to FIG. 15, a perspective view of the reflector insert 180 is shown. The reflector insert 180 may include, but is not limited to, the reflector device 182, a first stem 184, and a second stem 186. The reflector device 182 may further include a first lateral surface 187 and a second lateral surface 189.

Figure 16:
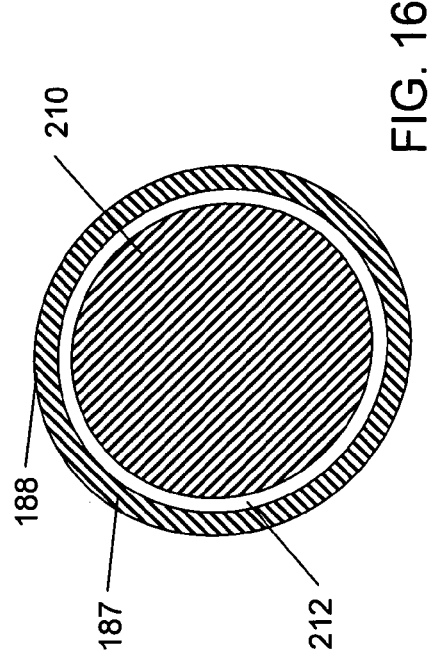
FIG. 16 is a bottom view of the insert of FIG. 15.

FIG. 16 shows a bottom view of the reflector insert 180. The first stem 184 may include, but is not limited to, a first lateral surface 210 and a first rod surface 212. The first rod surface 212 extends from the first lateral surface 187 of the reflector device 182 in a generally perpendicular direction. The first lateral surface 210 extends from the first rod surface 212 forming a closed stem that may be solid. In an alternative embodiment, the first stem 184 may further include a socket extending into the first lateral surface 210 thereby forming an open stem.

Figure 17:
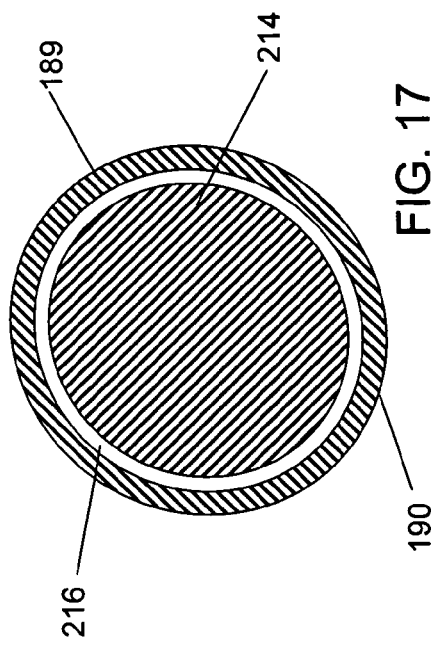
FIG. 17 is a top view of the insert of FIG. 15.

FIG. 17 shows a top view of the reflector insert 180. The second stem 186 may include, but is not limited to, a second lateral surface 214 and a second rod surface 216. The second rod surface 216 extends from the second lateral surface 189 of the reflector device 182 in a generally perpendicular direction. The second lateral surface 214 extends from the second rod surface 216 forming a closed stem that may be solid. In an alternative embodiment, the second stem 186 may further include a socket extending into the second lateral surface 214 thereby forming an open stem.

The reflector device 182 may be formed of aluminum or any other sufficiently rigid material. The reflector device 182 may be painted various colors, for example, white, yellow, black, etc. The reflector device 182 may be coated in reflective material. The dimensions of the reflector device 182 may be adjusted based on the size of the light reflectors 200, 202, 204, 206. The light reflectors 200, 202, 204, 206 may be corner cube reflectors. In an exemplary embodiment, the diameter of the first lateral surface 187 may be the same as the diameter of the second lateral surface 189 and may be approximately 0.625 inches. The diameter of the first lateral surface 187 may be different from the diameter of the second lateral surface 189. In an exemplary embodiment, the length of the reflector device 182 along the rod surface 191 is approximately 3.375 inches. The entrance/exit face 142 of the light reflectors 200, 202, 204, 206, in an exemplary embodiment, may be 12 millimeters in diameter. In an alternative embodiment, the diameter of the first lateral surface 210 of the first stem 184 may be greater than or equal to the diameter of the first lateral surface 187 of the reflector device 182. In an alternative embodiment, the diameter of the second lateral surface 214 of the second stem 186 may be greater than or equal to the diameter of the second lateral surface 189 of the reflector device 182.

In another alternative embodiment, a reflector insert 220 may be used as an insert in a reflector pole 54 in the manner depicted in FIG. 1. With reference to FIG. 18, a perspective view of the reflector insert 220 is shown. The reflector insert 220 may include, but is not limited to, a reflector device 222, a first stem 224, and a second stem 226. The reflector device 222 may include, but is not limited to, a first lateral surface 228, a rod surface 223, a second lateral surface 230, a first socket 232 (not shown in FIG. 18), a second socket 234, a third socket 236, a fourth socket 238 (not shown in FIG. 18), a fifth socket 239 (not shown in FIG. 15), a first light reflector 240 (not shown in FIG. 18), a second light reflector 242, a third light reflector 244, a fourth light reflector 246 (not shown in FIG. 18), and a fifth light reflector 247 (not shown in FIG. 18).

The first lateral surface 228 has a first exterior peripheral edge 229. The first exterior peripheral edge 229 defines a shape having a first center. The shape may be any shape including, but not limited to, circular, square, triangular, rectangular, hexagonal, etc. The second lateral surface 230 has a second exterior peripheral edge 231. The second exterior peripheral edge 231 defines a shape having a second center. The shape may be any shape including, but not limited to, circular, square, triangular, rectangular, hexagonal, etc. The rod surface 223 extends from the first exterior peripheral edge 229 to the second exterior peripheral edge 231.

The first socket 232, the second socket 234, the third socket 236, the fourth socket 238, and the fifth socket 239 have a size and shape sufficient to hold the first light reflector 240, the second light reflector 242, the third light reflector 244, the fourth light reflector 246, and the fifth light reflector 247, respectively. The first light reflector 240 is mounted in the first socket 232. The second light reflector 242 is mounted in the second socket 234. The third light reflector 244 is mounted in the third socket 236. The fourth light reflector 246 is mounted in the fourth socket 238. The fifth light reflector 247 is mounted in the fifth socket 239.

The first socket 232, the second socket 234, the third socket 236, the fourth socket 238, and the fifth socket 239 are formed in the rod surface 223 and arranged in a plurality of rows. Sockets in a row have a common distance from the first center to a center of the socket 232, 234, 236, 238, 239. Sockets in a row may also have a common vertical distance from the first exterior peripheral edge 229 and/or from the second exterior peripheral edge 231. A plurality of sockets may be arranged in a single row. For example, sockets 232 and 238 are shown mounted in a single row and sockets 234 and 239 are shown mounted in a single row. The number of sockets mountable in a single row generally is constrained by the width of the reflector device in a radial direction parallel to the first lateral surface 230. The light reflectors 232, 234, 236, 238, 239 are arranged to point in a direction rotated 72 degrees from an adjacent reflector thereby providing 360 degrees of coverage relative to a center axis extending from the first center to the second center. Thus, the laser light transmitted from the laser range finder 52 reflects from at least one reflector 232, 234, 236, 238, 239 regardless of the pointing direction from the laser range finder 52 to the pole 54. Where a different number of light reflectors is used, the light reflectors may be separated by a different number of degrees to provide the 360 degrees of coverage.

FIGS. 19–23 show side views of the reflector insert 220 successively rotated in 72 degree increments to show the arrangement of the first socket 232, the second socket 234, the third socket 236, the fourth socket 238, the fifth socket 239, and thus, the arrangement of the first light reflector 240, the second light reflector 242, the third light reflector 244, the fourth light reflector 246, and the fifth light reflector 247 mounted in the corresponding sockets 232, 234, 236, 238, 239. Thus, FIG. 20 shows the reflector insert 220 of FIG. 19 rotated 72 degrees about a center axis 248 in a clockwise direction as viewed from the second lateral surface 230. FIG. 21 shows the reflector insert 220 of FIG. 20 rotated 72 degrees in the same direction. FIG. 22 shows the reflector insert 220 of FIG. 21 rotated 72 degrees in the same direction. FIG. 23 shows the reflector insert 220 of FIG. 22 rotated 72 degrees in the same direction. FIGS. 21, 22, and 23 depict the reflector insert 220 mounted in the reflector pole 54.

The reflector device 222 may be formed of aluminum or any other sufficiently rigid material. The reflector device 222 may be painted various colors, for example, white, yellow, black, etc. The reflector device 222 may be coated in reflective material. The dimensions of the reflector device 222 may be adjusted based on the size of the light reflectors 240, 242, 244, 246, 247. The light reflectors 240, 242, 244, 246, 247 may be corner cube reflectors. In an exemplary embodiment, the diameter of the first lateral surface 228 may be the same as the diameter of the second lateral surface 230 and may be approximately one inch. In an alternative embodiment, the diameter of the first lateral surface 228 may be different from the diameter of the second lateral surface 230. In an exemplary embodiment, the length of the reflector device 222 along the center axis 248 is approximately two inches. The entrance/exit face 142 of the reflectors 240, 242, 244, 246, 247 in an exemplary embodiment, may be 9 millimeters in diameter. In an exemplary embodiment, the length of the first stem 224 is equal to the length of the second stem 226 and is 1.25 inches. In an exemplary embodiment, the diameter of the first lateral surface 250 of the first stem 224 is equal to the diameter of the first lateral surface 254 of the second stem 226 and is 0.875 inches. In an alternative embodiment, the diameter of the first lateral surface 250 of the first stem 224 may be greater than or equal to the diameter of the first lateral surface 228 of the reflector device 222. In an alternative embodiment, the diameter of the second lateral surface 254 of the second stem 226 may be greater than or equal to the diameter of the second lateral surface 230 of the reflector device 222.

In an alternative embodiment, a reflector device 262 may be used as an insert mounted in the reflector pole 54. With reference to FIGS. 24–28, the reflector device 262 may include, but is not limited to, a first lateral surface 268, a rod surface 263, a second lateral surface 270, a first socket 272, a second socket 274, a third socket 276, a fourth socket 278, a fifth socket 279, a first light reflector 280, a second light reflector 282, a third light reflector 284, a fourth light reflector 286, and a fifth light reflector 287. The first socket 272, the second socket 274, the third socket 276, the fourth socket 278, and the fifth socket 279 have a size and shape sufficient to hold the first light reflector 280, the second light reflector 282, the third light reflector 284, the fourth light reflector 286, and the fifth light reflector 287, respectively. The first light reflector 280 is mounted in the first socket 272. The second light reflector 282 is mounted in the second socket 274. The third light reflector 284 is mounted in the third socket 276. The fourth light reflector 286 is mounted in the fourth socket 278. The fifth light reflector 287 is mounted in the fifth socket 279.

FIGS. 24–28 show the reflector device 262 mounted in the reflector pole 54 and successively rotated in 72 degree increments to show the arrangement of sockets 272, 274, 276, 278, 279. Thus, FIG. 25 shows the reflector device 262 of FIG. 24 rotated 72 degrees about a center axis in a clockwise direction as viewed from the second lateral surface 270. FIG. 21 shows the reflector device 262 of FIG. 20 rotated 72 degrees in the same direction. FIG. 22 shows the reflector device 262 of FIG. 21 rotated 72 degrees in the same direction. FIG. 23 shows the reflector device 262 of FIG. 22 rotated 72 degrees in the same direction.

The reflector device 262 may be formed of aluminum or any other sufficiently rigid material. The reflector device 262 may be painted various colors, for example, white, yellow, black, etc. The reflector device 262 may be coated in reflective material. The dimensions of the reflector device 262 may be adjusted based on the size of the light reflectors 280, 282, 284, 286, 287. The light reflectors 280, 282, 284, 286, 287 may be corner cube reflectors. In an exemplary embodiment, the diameter of the first lateral surface 268 may be the same as the diameter of the second lateral surface 270 and may be approximately one inch. In an alternative embodiment, the diameter of the first lateral surface 268 may be different from the diameter of the second lateral surface 270. In an exemplary embodiment, the length of the reflector device 262 along the center axis is approximately two inches. The entrance/exit face 142 of the light reflectors 280, 282, 284, 286, 287 in an exemplary embodiment, may be 9 millimeters in diameter.

The components of the example reflector devices are described above with reference to a generally circular or cylindrical geometry. It is understood, however, that the invention may take the form of various other geometrical shapes, e.g., square, polygon, rectangle, triangle, etc. Additionally, the reflector device may include a stem and/or a socket for mounting to the reflector pole either at the top or within the pole as an insert. Thus, for example, the first lateral surface of the reflector device may include a stem while the second lateral surface may include a socket and vice versa.

The invention just described provides for the simple, accurate, and reliable determination of the distance from a laser range finder to a reflector device mounted at a desired target location. In an example use case, the reflector device may be mounted in a flagstick standing upright in a golf hole. Placement of the reflector device in the flagstick improves the accuracy and reliability of distance measurements determined in the laser range finder carried by the golfer by increasing the amount of laser light reflected back toward the laser range finder. It is understood that the invention is not confined to the particular embodiments set forth herein as illustrative, but embraces all such modifications, combinations, and permutations as come within the scope of the following claims. Thus, the description of the exemplary embodiments is for purposes of illustration and not limitation.

What is claimed is:

1. A method for determining a distance to a target, the method comprising:
   sending laser light at a first time from a device to a reflector device, the reflector device mounted to a pole, wherein the reflector device comprises:
   a first lateral surface having a first exterior peripheral edge;
   a second lateral surface having a second exterior peripheral edge;
   a rod surface extending from the first exterior peripheral edge to the second exterior peripheral edge;
   two to four sockets, the two to four sockets formed in the rod surface and arranged in a plurality of rows; and
   a light reflector mounted in one of the two to four sockets, the light reflector receiving a portion of the laser light and reflecting the received portion of the laser light back to the device;
   receiving laser light reflected from the light reflector at the device at a second time; and
   determining the distance from the device to the reflector device using the first time and the second time.

2. A device for reflecting laser light back to a laser range finder, the device comprising:
- a first lateral surface having a first exterior peripheral edge;
- a second lateral surface having a second exterior peripheral edge;
- a rod surface extending from the first exterior peripheral edge to the second exterior peripheral edge;
- two to four sockets, the two to four sockets formed in the rod surface and arranged in a plurality of rows; and
- a light reflector mounted in each of the two to four sockets, whereby a portion of laser light directed at the device from a laser is reflected back to the laser by at least one light reflector.

3. The device of claim 2, further comprising a first mounting socket, the first mounting socket extending from the first lateral surface, wherein a first stem at an end of a first pole is capable of insertion in the first mounting socket.

4. The device of claim 3, wherein an interior surface of the first mounting socket is threaded.

5. The device of claim 3, further comprising a second mounting socket, the second mounting socket extending from the second lateral surface, wherein a first stem at an end of a second pole is capable of insertion in the second mounting socket.

6. The device of claim 5, wherein an interior surface of the second mounting socket is threaded.

7. The device of claim 2, further comprising a first stem, the first stem extending from the first lateral surface in a direction opposite the first lateral surface, wherein the first stem is capable of insertion in a first socket at an end of a first pole.

8. The device of claim 7, wherein an exterior surface of the first stem is threaded.

9. The device of claim 7, further comprising a second stem, the second stem extending from the second lateral surface in a direction opposite the second lateral surface, wherein the second stem is capable of insertion in a first socket at an end of a second pole.

10. The device of claim 9, wherein an exterior surface of the second stem is threaded.

11. A device for reflecting laser light back to a laser range finder, the device comprising:
- a pole; and
- a reflector device, the reflector device mounted to the pole and comprising:
  - a first lateral surface having a first exterior peripheral edge;
  - a second lateral surface having a second exterior peripheral edge;
  - a rod surface extending from the first exterior peripheral edge to the second exterior peripheral edge;
  - two to four sockets, the two to four sockets formed in the rod surface and arranged in a plurality of rows; and
  - a light reflector mounted in each of the two to four sockets, whereby a portion of laser light directed at the device from a laser is reflected back to the laser by at least one light reflector.

12. A system for determining a distance to a target, the system comprising:
- a laser range finder, the laser range finder configured to:
  send laser light at a first time to a reflector device;
  receive a portion of the laser light reflected from the reflector device at a second time; and
  determine the distance from the laser range finder to the reflector device using the first time and the second time;
- a pole; and
- the reflector device mounted to the pole and comprising:
  - a first lateral surface having a first exterior peripheral edge;
  - a second lateral surface having a second exterior peripheral edge;
  - a rod surface extending from the first exterior peripheral edge to the second exterior peripheral edge;
  - two to four sockets, the two to four sockets formed in the rod surface and arranged in a plurality of rows; and
  - a light reflector mounted in each of the two to four sockets, whereby a portion of the laser light directed at the reflector device from the laser range finder is reflected back to the laser range finder by at least one light reflector.

13. A method for determining a distance to a target, the method comprising:
- sending laser light at a first time from a device to a reflector device, the reflector device mounted to a pole, wherein the reflector device comprises:
  - a first lateral surface having a first exterior peripheral edge;
  - a second lateral surface having a second exterior peripheral edge;
  - a rod surface extending from the first exterior peripheral edge to the second exterior peripheral edge;
  - a plurality of sockets, the plurality of sockets formed in the rod surface and arranged in a plurality of rows, wherein two or more sockets are arranged in at least one row of the plurality of rows; and
  - a light reflector mounted in one of the plurality of sockets, the light reflector receiving a portion of the laser light and reflecting the received portion of the laser light back to the device;
- receiving laser light reflected from the light reflector at the device at a second time; and
- determining the distance from the device to the reflector device using the first time and the second time.

14. A device for reflecting laser light back to a laser range finder, the device comprising:
- a first lateral surface having a first exterior peripheral edge;
- a second lateral surface having a second exterior peripheral edge;
- a rod surface extending from the first exterior peripheral edge to the second exterior peripheral edge;
- a plurality of sockets, the plurality of sockets formed in the rod surface and arranged in a plurality of rows, wherein two or more sockets are arranged in at least one row of the plurality of rows; and
- a light reflector mounted in each of the plurality of sockets, whereby a portion of laser light directed at the device from a laser is reflected back to the laser by at least one light reflector.

15. The device of claim 14, further comprising a first mounting socket, the first mounting socket extending from the first lateral surface, wherein a first stem at an end of a first pole is capable of insertion in the first mounting socket.

16. The device of claim 15, wherein an interior surface of the first mounting socket is threaded.

17. The device of claim 15, further comprising a second mounting socket, the second mounting socket extending from the second lateral surface, wherein a first stem at an end of a second pole is capable of insertion in the second mounting socket.

18. The device of claim 17, wherein an interior surface of the second mounting socket is threaded.

19. The device of claim 14, further comprising a first stem, the first stem extending from the first lateral surface in a direction opposite the first lateral surface, wherein the first stem is capable of insertion in a first socket at an end of a first pole.

20. The device of claim 19, wherein an exterior surface of the first stem is threaded.

21. The device of claim 19, further comprising a second stem, the second stem extending from the second lateral surface in a direction opposite the second lateral surface, wherein the second stem is capable of insertion in a first socket at an end of a second pole.

22. The device of claim 21, wherein an exterior surface of the second stem is threaded.

23. A device for reflecting laser light back to a laser range finder, the device comprising:
   a pole; and
   a reflector device, the reflector device mounted to the pole and comprising:
   a first lateral surface having a first exterior peripheral edge;
   a second lateral surface having a second exterior peripheral edge;
   a rod surface extending from the first exterior peripheral edge to the second exterior peripheral edge;
   a plurality of sockets, the plurality of sockets formed in the rod surface and arranged in a plurality of rows, wherein two or more sockets are arranged in at least one row of the plurality of rows; and
   a light reflector mounted in each of the plurality of sockets, whereby a portion of laser light directed at the device from a laser is reflected back to the laser by at least one light reflector.

24. A system for determining a distance to a device, the system comprising:
   a laser range finder, the laser range finder configured to:
   send laser light at a first time to a reflector device;
   receive a portion of the laser light reflected from the reflector device at a second time; and
   determine the distance from the laser range finder to the reflector device using the first time and the second time;
   a pole; and
   the reflector device mounted to the pole and comprising:
   a first lateral surface having a first exterior peripheral edge;
   a second lateral surface having a second exterior peripheral edge;
   a rod surface extending from the first exterior peripheral edge to the second exterior peripheral edge;
   a plurality of sockets, the plurality of sockets formed in the rod surface and arranged in a plurality of rows, wherein two or more sockets are arranged in at least one row of the plurality of rows; and
   a light reflector mounted in one of the plurality of sockets, whereby a portion of the laser light directed at the reflector device from the laser range finder is reflected back to the laser range finder by at least one light reflector.

* * * * *